(12) United States Patent
Kishino

(10) Patent No.: US 8,451,463 B2
(45) Date of Patent: May 28, 2013

(54) INFORMATION PROCESSING APPARATUS AND INFORMATION PROCESSING METHOD

(75) Inventor: Mariko Kishino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 823 days.

(21) Appl. No.: 11/391,119

(22) Filed: Mar. 28, 2006

(65) Prior Publication Data

US 2006/0232810 A1    Oct. 19, 2006

(30) Foreign Application Priority Data

Mar. 29, 2005   (JP) .................................. 2005-095693

(51) Int. Cl.
*G06F 3/12* (2006.01)

(52) U.S. Cl.
USPC ......... 358/1.13; 358/1.15; 709/202; 709/203; 709/221; 709/222; 710/8; 710/10; 710/12; 710/14; 719/327

(58) Field of Classification Search
USPC ................ 358/1.15, 1.13, 1.16, 1.9; 709/202, 709/203, 221, 222; 710/8, 10, 12, 14; 719/327
See application file for complete search history.

(56) References Cited

U.S. PATENT DOCUMENTS

| | | | | |
|---|---|---|---|---|
| 5,692,111 | A * | 11/1997 | Marbry et al. ............... | 358/1.15 |
| 6,825,941 | B1 * | 11/2004 | Nguyen et al. ............... | 358/1.15 |
| 7,065,770 | B2 | 6/2006 | Nomura et al. | |
| 7,248,383 | B2 * | 7/2007 | Yoshida et al. .............. | 358/1.15 |
| 7,366,980 | B2 * | 4/2008 | Small ........................... | 715/248 |
| 7,426,694 | B2 * | 9/2008 | Gross et al. .................. | 715/762 |
| 7,693,961 | B2 | 4/2010 | Nomura et al. | |
| 2002/0002604 | A1 | 1/2002 | Nomura et al. | |
| 2002/0002630 | A1 | 1/2002 | Nomura et al. | |
| 2002/0095526 | A1 * | 7/2002 | Herzi ............................ | 709/327 |
| 2003/0233488 | A1 | 12/2003 | Ozaki et al. | |
| 2004/0070640 | A1 | 4/2004 | Ferlitsch | |
| 2004/0223182 | A1 | 11/2004 | Minagawa | |
| 2005/0038927 | A1 | 2/2005 | Choi et al. | |
| 2005/0039193 | A1 * | 2/2005 | Choi et al. ................... | 719/321 |
| 2006/0072140 | A1 * | 4/2006 | Mitani ......................... | 358/1.13 |

FOREIGN PATENT DOCUMENTS

| | | |
|---|---|---|
| EP | 1372061 A2 | 12/2003 |
| JP | 2001-043050 A | 2/2001 |
| JP | 2002-023879 A | 1/2002 |
| JP | 2002-182920 A | 6/2002 |
| JP | 2002-297326 A | 10/2002 |
| JP | 2003-208276 A | 7/2003 |
| JP | 2003-208276 A | 7/2003 |
| JP | 2005-050062 A | 2/2005 |
| KR | 2003-0096075 A | 12/2003 |
| KR | 2005-0015925 A | 2/2005 |

OTHER PUBLICATIONS

A development support tool for strongly supporting creation of an installer, InstallStudio 7.0J,Visual Basic magazine, vol. 5, No. 13, Japan, Shoeisha, Aug. 1, 1999.

Tso, "Standalone Device Drivers in Linux", Proceedings of the Freenix Track: 1999 Usenix Annual Technical Conference, USENIX The Advanced Computing Systems Association, Monterey, California, Jun. 11, 1999, pp. 1-14.

Theodore Ts'o, Standalone Device Drivers in Linux, Conference, Jun. 6, 1999, pp. 1-14, XP-002609355, USENIX, Monterey, California, United States.

* cited by examiner

*Primary Examiner* — Vu B Hang
(74) *Attorney, Agent, or Firm* — Canon USA, Inc., IP Division

(57) ABSTRACT

An information processing method includes the steps of acquiring information for identifying customized drivers; displaying the customized drivers in such a way as to be identifiable based on the information acquired in the acquisition step; selecting a driver to be installed from the customized drivers displayed in the display step; and installing the customized driver selected in the selection step.

12 Claims, 10 Drawing Sheets

FIG. 7

```
98/ME INF FILE
...
[Version]
Signature="$CHICAGO$"
Class=Printer
Provider=%CANON%
DriverVer=11/27/2004, 10. 60. 0. 7
...
```
— 700
730 → Signature="$CHICAGO$"

```
NT4.0 INF FILE
...
[Version]
Signature="$Windows NT$"
Provider=%CANON%
LayoutFile=cnl40jnt.inf
ClassGUID={4D36E979-E325-11CE-BFC1-08002BE10318}
Class=Printer
DriverVer=11/27/2004, 10. 60. 0. 7
...
[Strings]
CANON="Canon"
CLASSNAME="Printer"
NS_LMON_CPCA="CPCA Language Monitor2, AUCPLMNT.DLL"
DISK1="LIPS4 Printer Driver for Microsoft Windows.NT Version 4.0
Version 10.60 Installer Disk"
```
— 710
740 → Signature="$Windows NT$"
760 → DISK1="LIPS4 Printer Driver for Microsoft Windows.NT Version 4.0 Version 10.60 Installer Disk"

```
2000/XP/SERVER 2003 INF FILE
...
[Version]
Signature="$Windows NT$"
Provider=%CANON%
ClassGUID={4D36E979-E325-11CE-BFC1-08002BE10318}
Class=Printer
DriverVer=11/27/2004, 10. 60. 0. 7
CatalogFile.NTx86=CNL.40J.CAT
...
[Strings]
CANON="Canon"
NS_LMON_CPCA="CPCA Language Monitor2, AUCPLMNT.DLL"
DISK1="LIPS4 Printer Driver for Microsoft Windows 2000/XP/
Server 2003 Version 10.60 Installer Disk"
```
— 720
750 → Signature="$Windows NT$"
770 → DISK1="LIPS4 Printer Driver for Microsoft Windows 2000/XP/ Server 2003 Version 10.60 Installer Disk"

INFORMATION PROCESSING APPARATUS AND INFORMATION PROCESSING METHOD

BACKGROUND OF THE INVENTION

1. Field of the Invention

The present invention relates to an information processing apparatus and method for customizing a device driver (hereinafter, referred to as a printer driver).

2. Description of the Related Art

There is often a need to customize device control programs or drivers such as printer drivers, according to the installation environment of a printing system. Particularly, in recent years, customer's usage patterns have diversified with a proliferation of destinations where printing systems are installed, such that the demands for customizing a printer driver are on the increase.

Now, an IT manager typically manages printer drivers of in-house client PCs collectively. The IT manager customizes the printer drivers in advance and distributes them to a lot of client PCs under his or her control or causes the client PCs to download them. For example, a default setting is set to 2-sided printing, or color printing for a temporary employee is disabled, to make users use printer drivers with the same setting or different settings according to users. This type of collective management allows the versions of printer drivers installed in the client PCs to be collectively captured and managed, thereby reducing an output cost and decreasing loads of individual inquiries from users. Therefore, a total cost of ownership (TCO) reduction can be expected from the collective management.

There is a description of installing a printer driver customized based on initialization information stored on the server side, for example, in Japanese Laid-Open Patent Publication No. 2003-208276.

In the conventional customization system, however, even if an IT manager previously makes settings for customizing a printer driver, all related printer drivers (for example, all family drivers) are displayed independently of whether the printer drivers have already been customized when an end user installs the printer driver. In other words, both customized and non-customized printer drivers are displayed as printer drivers to be installed on a user interface screen. Since no identification indicating that a printer driver has already been customized is displayed on the screen display, the architecture in which all family drivers are displayed independently of whether they have already been customized is inconvenient in operability when the end user selects a customized driver to be naturally installed.

SUMMARY OF THE INVENTION

The present invention provides an information processing technology enabling only customized printer drivers to be displayed for a user as ones to be installed when a printer driver is installed.

According to an aspect of the present invention there is provided an information processing apparatus for customizing a device driver for controlling peripheral devices. The information processing apparatus includes: forming means for forming a customized device driver; and writing means for writing identification information for identifying the customized device driver formed by the forming means as installation information to be used when the device driver is installed.

According to another aspect of the present invention there is provided an information processing apparatus which includes: acquisition means for acquiring information for identifying customized device drivers; display means for displaying the customized device drivers in such a way as to be identifiable based on the information acquired by the acquisition means; selection means for selecting a driver to be installed from the customized device drivers displayed by the display means; and installation means for installing the customized device driver selected by the selection means.

According to another aspect of the present invention there is provided an information processing method for an information processing apparatus for customizing a device driver for controlling peripheral devices. The information processing method includes: forming a customized device driver; and writing identification information for identifying the customized device driver formed as installation information to be used when the customized device driver is installed.

According to yet another aspect of the present invention, there is provided an information processing method which includes: acquiring information for identifying customized device drivers; displaying the customized device drivers in such a way as to be identifiable based on the information acquired; selecting a driver to be installed from the customized device drivers displayed; and installing the customized device driver selected.

Other features of the present invention will be apparent from the following description taken in conjunction with the accompanying drawings, in which like reference characters designate the same or similar parts throughout.

BRIEF DESCRIPTION OF THE DRAWINGS

FIG. 7 is a diagram illustrating a descriptive content of the INF file for describing the installation information on the printer driver.

DESCRIPTION OF THE EMBODIMENTS

[First Embodiment]

Hereinafter, exemplary embodiments of the present invention will be described in detail in accordance with the accompanying drawings. While this embodiment is described by giving an example of a method of customizing a printer driver for Windows (Registered Trademark), which is an operating system (OS) for a PC manufactured by Microsoft (Registered Trademark), the scope of the present invention is not limited to the operating system. For example, the present invention can also be applied in Longhorn, which is the next OS of the Windows (Registered Trademark) operating system manufactured by Microsoft (Registered Trademark).

Figure 1:
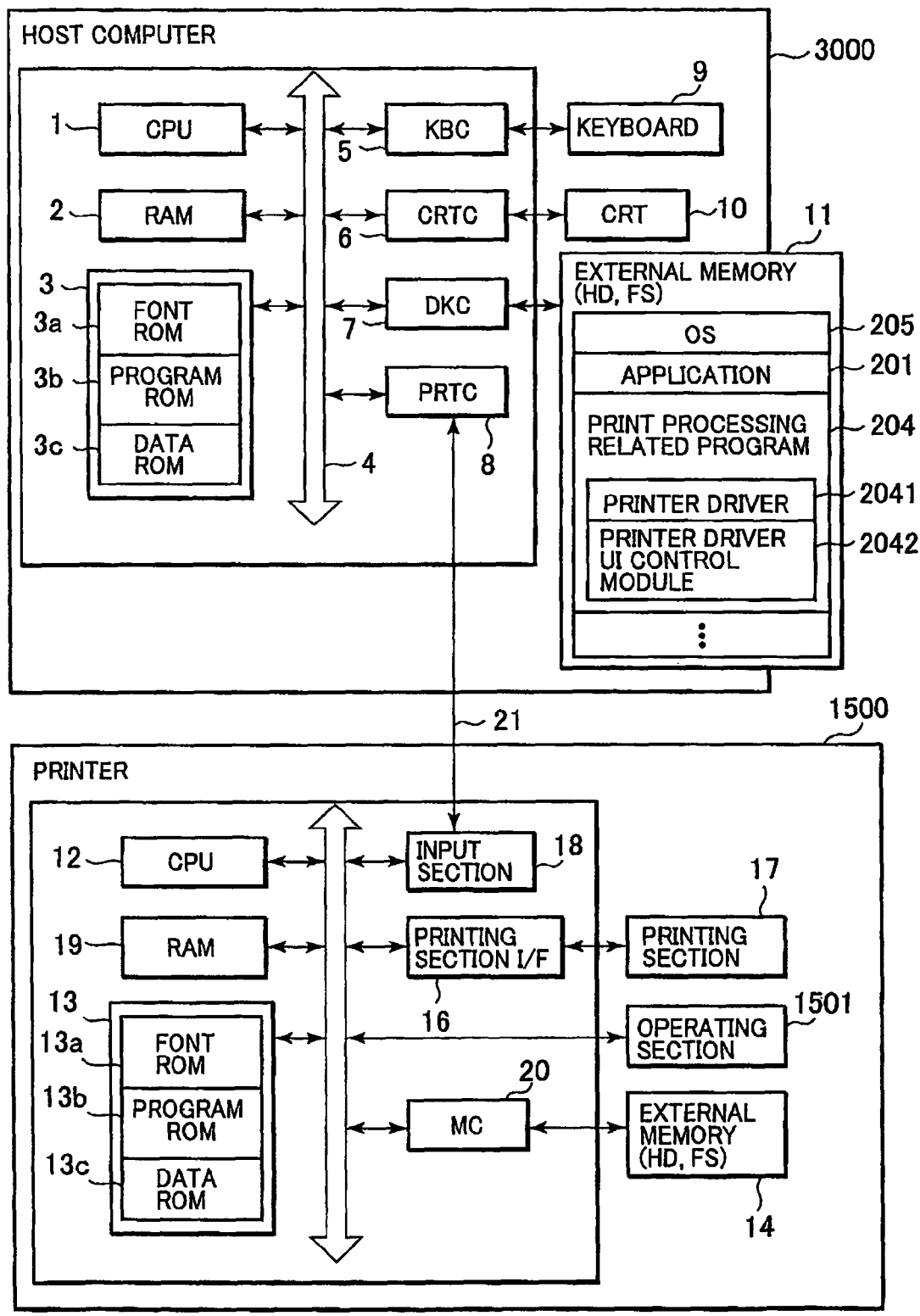
FIG. 1 is a block diagram showing a configuration of a print processing system according to an embodiment of the present invention.

FIG. 1 is a block diagram showing the configuration of a print processing system according to an embodiment of the present invention. The print processing system includes an information processing apparatus (hereinafter, also referred to as a host computer) 3000 and a printer 1500 for receiving print data from the host computer 3000 and printing the print data.

In the host computer 3000, a CPU 1 controls devices connected to a system bus 4 according to programs stored in a RAM 2. The RAM 2 also serves as a main memory, a work area, and the like of the CPU 1. A ROM 3 stores various programs and data, and is partitioned into three sections: a font ROM 3a for storing various fonts; a program ROM 3b for storing a boot program, BIOS, and the like; and a data ROM 3c for storing various data.

A keyboard controller (KBC) 5 controls key inputs from a keyboard (KB) 9 and a pointing device (mouse) not shown. A CRT controller (CRTC) 6 controls display on a CRT display (CRT) 10. A disk controller (DKC) 7 controls access to an external memory 11 such as a hard disk. A printer controller (PRTC) 8 is connected to the printer 1500 via an interface 21 for the purpose of communication control processing with the printer 1500.

The external memory 11 includes, for example, a hard disk (HD), MO, floppy disk (FD), and the like, and stores various applications (for example, a document processing application program used to execute document processing including graphics, images, text, tables, and the like) 201, and a print processing related program 204 as well as an operating system program (hereinafter, OS) 205. Also, the external memory 11 stores user files, edit files, and the like. The print processing related program 204 is a program that generates print data described using a page description language and can be commonly used for a plurality of printers of the same series. Also, the print processing related program 204 includes a printer control command generation module (hereinafter, referred to as a printer driver) 2041 and a printer driver user interface (UI) control module 2042.

An application 201 including a customize tool program (hereinafter, simply referred to as a customize tool) according to this embodiment are loaded onto the RAM 2 and are executed by the CPU 1. The CPU 1 executes, for example, a rasterizing process of outline font data onto the RAM 2 to allow WYSIWYG (What You See Is What You Get) on the CRT 10. Furthermore, the CPU 1 opens various registered windows on the basis of commands designated by a mouse cursor (not shown) or the like on the CRT 10 and executes various data processes. When executing a print process, the user opens a print setting screen (controlled by the printer driver UI control module 2042) and can make settings of the printer, and settings of a print process for the printer driver 2041 including selection of a print mode.

The configuration of the printer 1500 will be described below. The CPU 12 controls the overall operations of the printer 1500. A RAM 19 serves as a main memory, work area, or the like, and is also used as an output information rasterizing area and environment data storage area. Also, the RAM 19 includes an NVRAM (non-volatile RAM) area, and its memory size can be expanded by an option RAM connected to an expansion port (not shown). A ROM 13 includes a font ROM 13a for storing various fonts, a program ROM 13b for storing a control program and the like to be executed by the CPU 12, and a data ROM 13c for storing various data. An input section 18 exchanges data with the host computer 3000. A printing section interface (I/F) 16 controls interfacing with a printing section 17 as a printer engine.

An external memory 14 undergoes access control by a memory controller (MC) 20 and includes a hard disk (HD), MO, floppy disk (FD), IC card, and the like, which are connected as options. The external memory 14 stores font data, emulation programs, form data, and the like. When the external memory 14 such as a hard disk or the like is not connected, the data ROM 13c of the ROM 13 stores information and the like used by the host computer 3000. Note here that the number of external memories 14 is not limited to one, but a plurality of external memories 14 may be connected. For example, a plurality of external memories storing an option font card in addition to built-in font data, and a program for use in interpreting a printer control language of a different language system may be connected.

An operating section 1501 is provided with a control panel that accepts user's operations, where switches, LED indicators, and the like for operations are arranged on that control panel (not shown). The printer may have an NVRAM (not shown), which stores printer mode setting information from the control panel.

The CPU 12 outputs an image signal as output information to the printing section (printer engine) 17 via the printing section interface 16 on the basis of the control program and the like stored in the program ROM 13b of the ROM 13. The CPU 12 can communicate with the host computer 3000 via the input section 18. The CPU 12 receives print data sent from the host computer 3000 can notify the host computer 3000 of information in the printer 1500 and the like.

Figure 2:
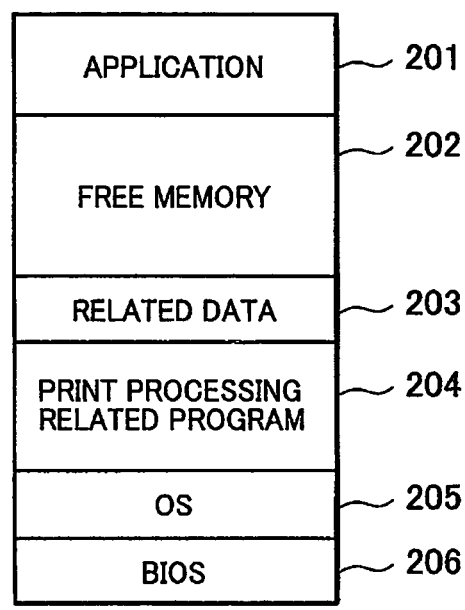
FIG. 2 is a diagram showing a memory map of a RAM of a host computer with the RAM having a program and data loaded therein, after the startup of a predetermined application and a print processing related program.

FIG. 2 shows a memory map of the RAM 2 after a predetermined application and the print processing related program are launched and then the programs and data are loaded onto the RAM 2 of the host computer 3000.

On the RAM 2, the applications 201, the print processing related program 204, and related data 203 are loaded as well as BIOS 206 and OS 205. Moreover, a free memory area 202 is secured. Thereby, the applications 201 and print processing related program 204 are ready to run. Note that the printer driver UI control module 2042 (FIG. 1) of the print processing related program 204 displays the print setting screen on the CRT 10 in accordance with a user's print setting command and allows the user to make settings using the KB 9 and the like.

Figure 3:
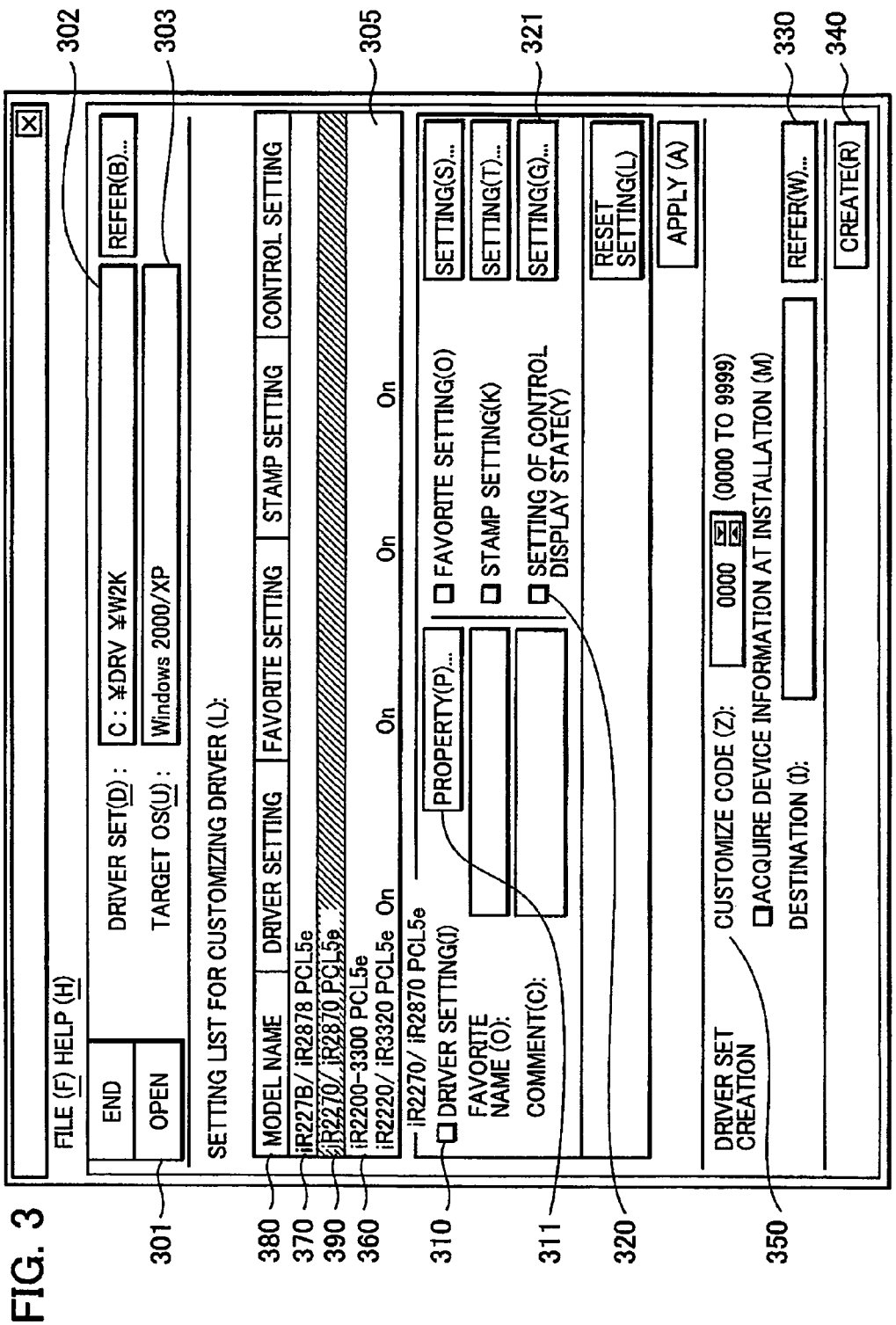
FIG. 3 is a diagram illustrating a customize tool user interface (UI).

FIG. 3 shows an example of the customize tool UI. The customize tool runs on the Windows (Registered Trademark) 2000/XP/Server 2003 to customize printer drivers for Windows (Registered Trademark) 98/ME, Windows (Registered Trademark) NT 4.0, and Windows (Registered Trademark) 2000/XP/Server 2003 in this example. The present invention does not intend to limit an OS to these OSes, but it is also applicable to other OSes, for example, Longhorn, which is the next OS.

In FIG. 3, when the user specifies "Open" in a menu 301, a dialogue (not shown) for specifying a folder of a driver set to be customized appears, by which the user can specify a destination for storing drivers to be customized. The specified folder appears in a display field 302 and the corresponding OS of the specified driver set appears in a display field 303.

A list view 305 displays corresponding model names of printer drivers that can be customized and indications of whether the printer drivers have already been customized. For a printer driver already customized, identification "On" is displayed. In the example shown in FIG. 3, a heading bar 380 indicates display fields for printer drivers in the list view 305. The printer driver corresponding to the printer model name 360 has already been customized. Moreover, the reversed display indicates a printer model name 390 selected as a target of the customization. Printer model name (hereinafter, also referred to as model names) 370 indicates a model name that has not been customized yet.

When the user checks a check box 310, a button 311 is enabled. When the user depresses the button 311, a printer driver UI (FIG. 4) for customization appears, and the user can set initial values for print settings (document properties), initial values for device settings (printer properties), and the like.

When the user checks a check box 320, a button 321 is enabled. When the user depresses the button 321, the UI (FIG. 5) for customizing display methods of controls on the printer driver UI appears, and the user can set the display methods of the controls on the printer driver UI for customization.

By depressing the button 330, a dialogue (not shown) for specifying a destination for creating customized drivers appears where the user can specify the destination for creating the customized drivers.

When the user controls a spin box 350 or inputs a value, the value input here, namely, specific information (customize code) for uniquely specifying customized drivers is retained in a customize information file.

Upon depressing a button 340 after making various settings, customization for the printer drivers selected according to the settings is executed.

Figure 4:
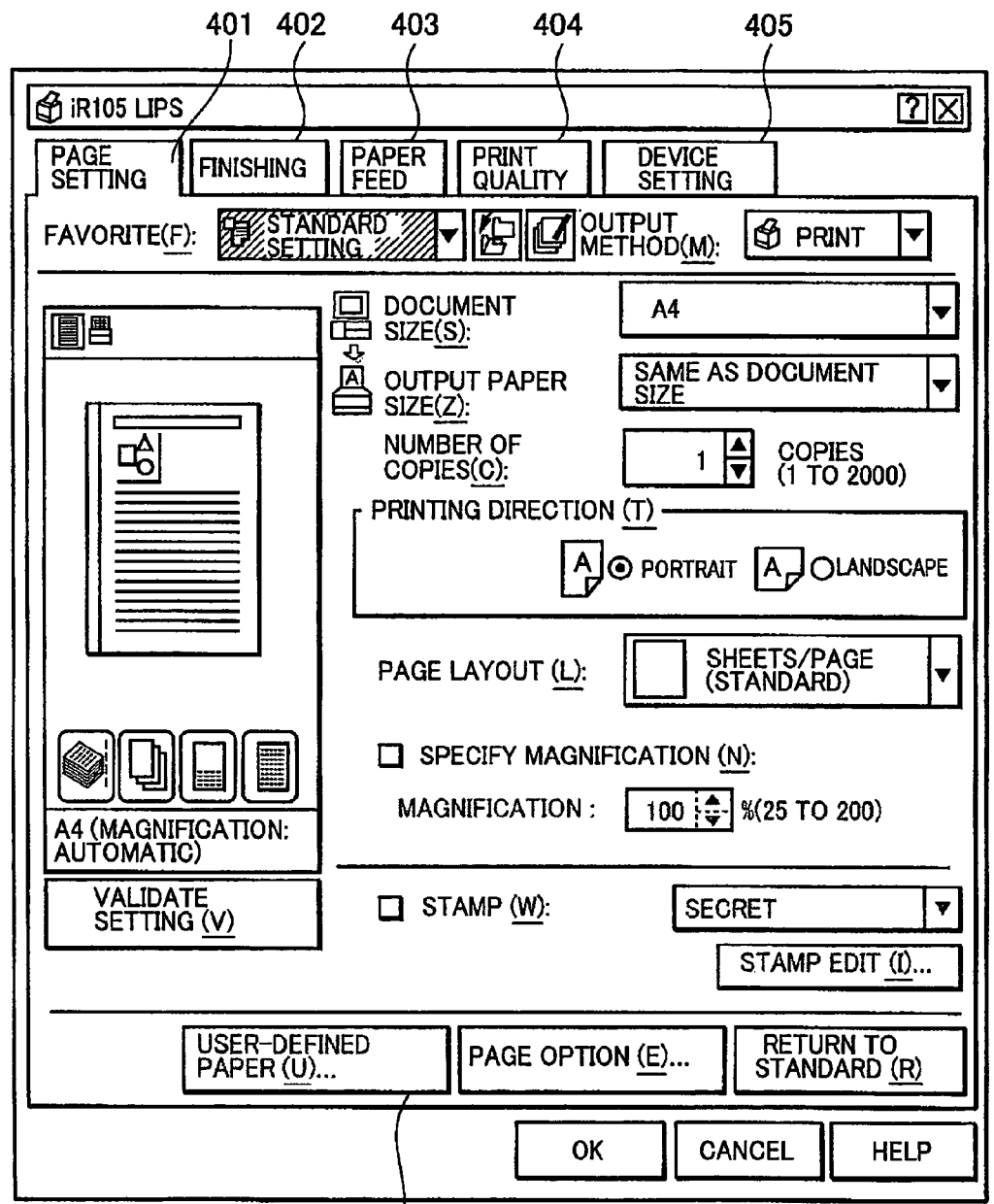
FIG. 4 is a diagram showing a printer driver UI for default setting customization.

FIG. 4 shows a printer driver UI for default setting customization (default setting customization UI) of the printer drivers (hereinafter, also simply referred to as drivers) displayed when the button 311 is depressed on the UI shown in FIG. 3.

The customize tool serves as a setting section of the information processing apparatus under the control of the CPU 1, and the setting section causes a display of a setting screen for making property settings for a document and property settings for a device, such as, for example, the UI screen shown in FIG. 4, on the CRT.

In printer drivers for Windows (Registered Trademark) NT 4.0 and Windows (Registered Trademark) 2000/XP/Server 2003, the document property UI for document settings and the printer property UI for device settings cannot be displayed at a time on one UI screen for printer driver settings in an ordinary installation. The printer driver UI for customization according to this embodiment of the present invention is displayed by the customize tool using a printer driver module, where the document property UI for document settings and the printer property UI for device settings are displayed at a time on one UI screen (FIG. 4). In FIG. 4, the following types of document property UIs can be displayed: page setting 401, finishing 402, paper feed 403, and print quality 404. As the printer property UI, a device setting 405 can be displayed. Through these UIs (401 to 405), initial values of the document properties and an initial value of the printer property can be set.

Furthermore, settings not to be customized are grayed out, for example, as indicated by reference numeral 410, to prevent acceptance of user's input of the settings in the UI shown in FIG. 4.

Figure 5:
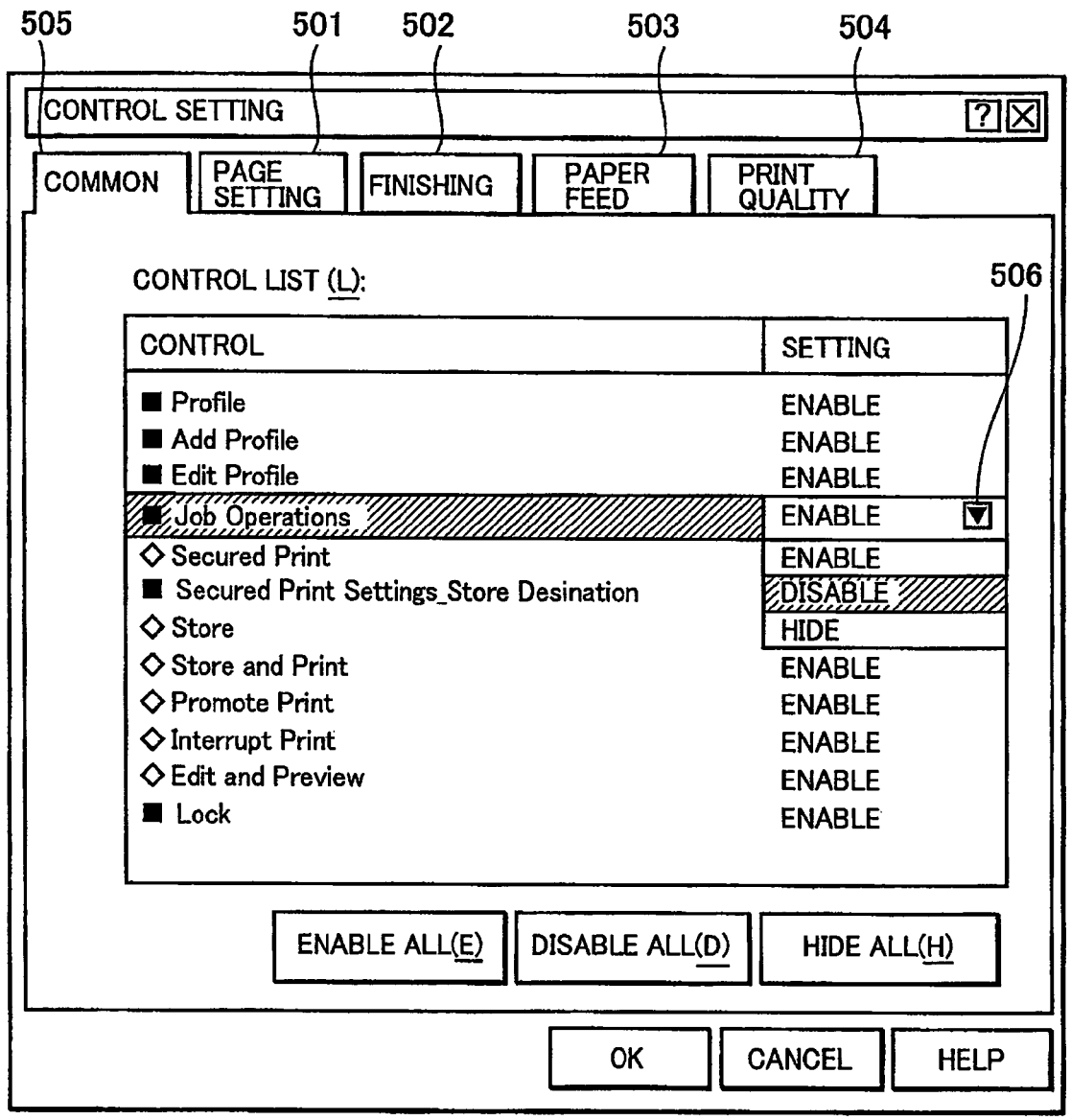
FIG. 5 is a diagram illustrating a document property display control setting UI.

FIG. 5 shows a document property display control setting UI, which is displayed on the CRT 10 of the host computer 3000 when the user depresses the button 321 in FIG. 3. In an example of the screen shown in FIG. 5, the following display controls can be set: page setting 501, finishing 502, paper feed 503, print quality 504, and common setting 505. The page setting 501, finishing 502, paper feed 503, and print quality 504 enable the display control settings corresponding to the UIs of the document properties shown in FIG. 4, respectively. The common setting 505 enables the display control settings common to these display controls.

At reference numeral 506, the settings of control item "Job Operations" are specifically shown, so that the user can specify an Enable display (normal display), a Disable display (always disabling the display), or a nondisplay (hide). Similarly, with individual settings of the Enable, Disable, or nondisplay for other control items, the displays of the document property UIs can be controlled. After the inputs of these settings, the customize tool writes them into a GPD file.

The customize tool serves as a display control section of the information processing apparatus under the control of the CPU 1, and the display control section can control the display with the Enable display, the Disable display, or the nondisplay for the items of the user interface (UI) on the basis of the set document properties (including the control items).

The information processing apparatus for customizing printer drivers, which control the printer, with settings of properties (initial value data related to document properties for document settings and initial value data related to printer properties for device settings) includes a storage section for storing information for identifying a device driver (printer driver) corresponding to a printer driver to be customized and document property settings or device property settings for customizing the printer driver into a storage area (for example, the RAM 2 or the external memory 11); a creating section (also referred to as a forming section) for creating a customized driver on the basis of the document property settings or the device property settings; and a writing section for writing information for identifying a device driver (printer driver) stored in the storage area into a model name storage area (list section) of a file for describing installation information on the device driver (printer driver) in order to identify the customized driver created by the creating section. In the information processing apparatus, the processes of the above sections are executed by executing the customize tool under the control of the CPU 1.

Note here that the information for identifying the device driver (printer driver) includes information on a device model name, a printer driver type, or a printer driver version.

With reference to a flowchart shown in FIG. 6, the following describes a process of executing customization and a process of writing information for identifying a device driver (printer driver) corresponding to a customized printer driver (the information includes a device model name, a printer driver type, or a printer driver version: the device model name is used as an example in the following description) into a file for describing the installation information on the printer driver (hereinafter, referred to as an INF file). The INF file allows the customize tool to write, read, and delete data. The file is assumed to include a model name storage area (the area is also referred to as a list section) for storing information for identifying the device driver (printer driver) corresponding to the customized printer driver and an area for describing a character string resource for identifying a printer driver adaptable to customization. Moreover, it is assumed that the program (installer) for installing a printer driver can read information on the model name corresponding to the customized printer driver written into the model name storage area of the INF file and can display only the read information on the model name corresponding to the customized printer driver on the CRT 10 when an end user installs the printer driver.

Figure 6:
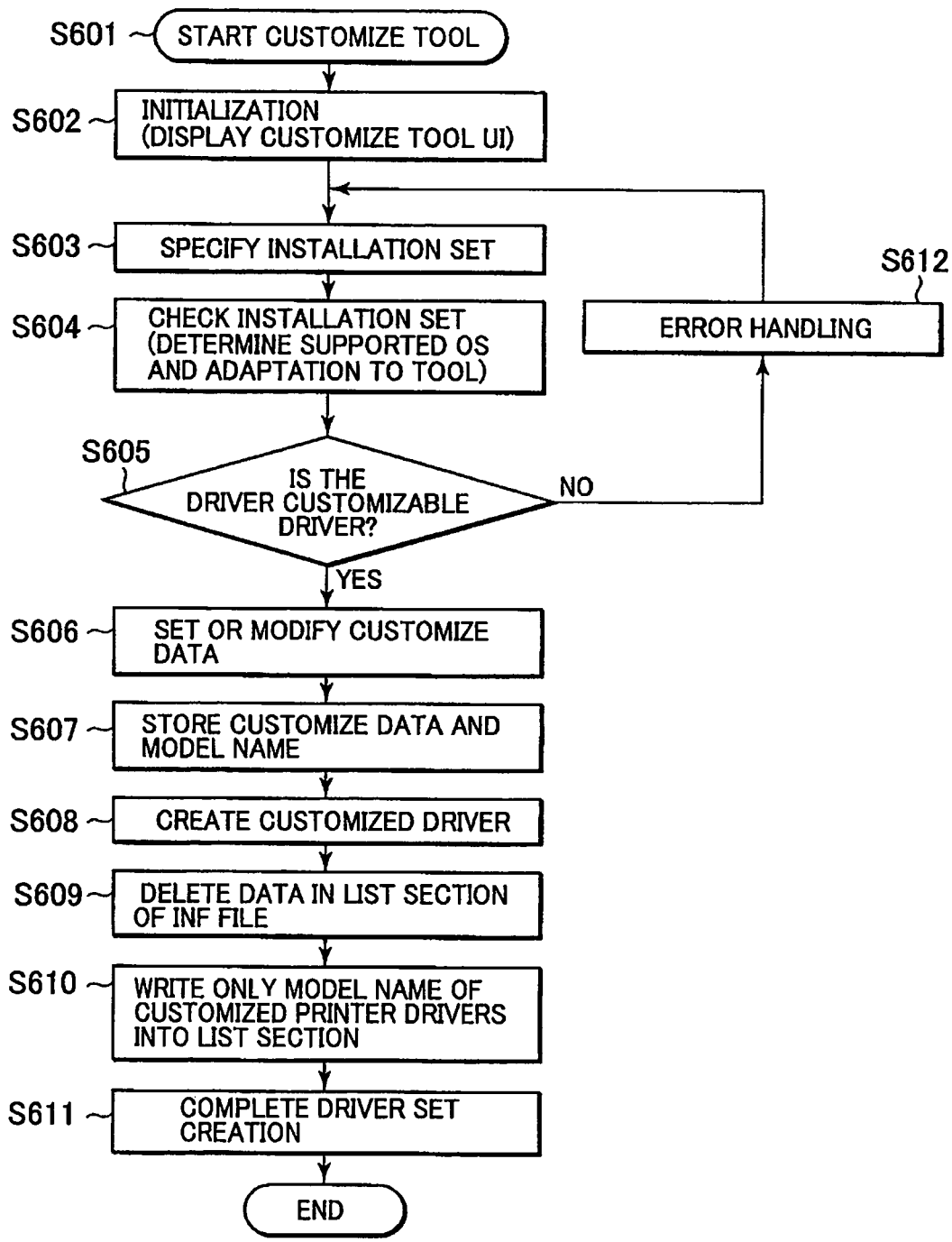
FIG. 6 is a flowchart for explaining a flow of the execution of customization and processing of writing information on a model name corresponding to a customized printer driver into an INF file for describing installation information on the printer driver according to a first embodiment.

Note that the processing of the flowchart in FIG. 6 is assumed to be executed mainly by the customize tool, which is implemented by the CPU 1 in the host computer 3000.

First, when the user starts the customize tool in step S601, an initialization process of the customize tool is started, and in step S602 the customize tool displays the UI screen described with reference to FIG. 3 on the CRT 10. When the user specifies an installation set of a printer driver to be customized on the UI screen in FIG. 3 in step S603, the specified installation set is checked in step S604. In the check process of the installation set, the customize tool determines whether the OS is supported by the specified installation set and whether the specified printer driver is adaptable to customization with the customize tool from the descriptive content of the file (INF file) for describing the installation information on the printer driver shown in FIG. 7 (700, 710, and 720 in FIG. 7).

Here FIG. 7 shows the descriptive content of the INF file for describing the installation information on the printer driver. The INF file contains module descriptive information (not shown). It is then assumed that the customize tool can identify the module that is performing the UI process of the printer driver on the basis of the module descriptive information. In FIG. 7, reference numerals 700, 710, and 720 designate a part of an INF file for Windows (Registered Trademark) 98/ME, a part of an INF file for Windows (Registered Trademark) NT4.0, and a part of an INF file for Windows (Registered Trademark) 2000/XP/Server 2003, respectively. The customize tool implemented by the CPU 1 determines the printer driver as one for Windows (Registered Trademark) 98/ME if the "Signature" setting 730 in the INF file 700 is a character string resource ("$CHICAGO$").

Furthermore, if a "Signature" setting (740, 750) in the INF file (710, 720) is a character string resource ("$Windows (Registered Trademark) NT$), the customize tool determines the printer driver as one for Windows (Registered Trademark) NT4.0 or for Windows (Registered Trademark) 2000/XP/Server 2003. Moreover, for narrowing, the customize tool determines the printer driver as one for Windows (Registered Trademark) NT4.0 if "NT" is included in the "DISK1" (760, 770) setting character string resource in the INF file (710, 720) and determines the printer driver as one for Windows (Registered Trademark) 2000/XP/Server 2003 unless "NT" is included in the setting character string resource.

The printer driver adaptable to customization includes the character string resource indicating that in the INF file, and therefore the customize tool can determine whether the printer driver is adaptable to customization by determining whether the character string resource is included in the INF file of the printer driver at the time of determination.

Returning to description of FIG. 6, if the customize tool determines that the printer driver is not a customizable driver in step S605 (S605: NO), it advances the process to step S612 for error handling and then returns to the step of specifying an installation set again (S603).

On the other hand, if the customize tool determines that the printer driver is a customizable driver in the determination of step S605 (S605: YES), it advances the process to step S606, where the customize tool controls the CRTC 6 to display the UI screen, which has been described with reference FIG. 3 to FIG. 5, on the CRT 10 to enable data for customizing the printer driver (customization data) to be set or modified. The settings entered in FIG. 3 to FIG. 5 are customization data. The customization data is set in a GPD file, which is a file that can be read out by the printer driver. When installed and set into an operating state, the printer driver reads the setting values in the GPD file. The printer driver then reflects the customized values in the GPD file. For example, the preset of a frequently-used print setting value (double-sided, 2-in-1, or the like) is previously reflected on the printer driver. Only by installing the customized printer driver, the printer driver is put into the condition where frequently-used print setting value or a customized default value for print setting, which is set to the printer driver when the printer driver is instructed to resume the original condition, are set in the printer driver.

In this regard, the IT manager can make document property settings and the device property settings through changing initial values of the printer driver such as, for example, disabling color printing and changing the setting of 2-up printing back to the default, by using the customize tool on the IT manager's computer. The settings entered in FIG. 3 to FIG. 5 are to be customization data for customizing the printer driver.

In step S607, the customized data, which has been set or modified in step S606, and the model name corresponding to the printer driver to be customized are stored in the storage area (for example, the RAM 2 or the external memory 11). For example, the model name 370 selected as a target of customization on the UI screen in FIG. 3 and the customization data, which has been set in FIG. 3 to FIG. 5, are stored in the storage area by the customize tool.

Upon depressing the "Create" button 340 in FIG. 3 after entering the various settings on the UI screen in FIG. 3 to FIG. 5, the printer driver customized according to the settings is created (S608). When receiving an instruction of executing the customization process, the customize tool creates a customized driver (hereinafter, also referred to as a customized driver) of the selected printer driver on the basis of the customization data stored in the storage area.

The customize tool serves as a creating section in the information processing apparatus under the control of the CPU 1. The creating section writes the document or device properties, which have been set, into the driver information file of the printer driver (device driver) to create a customized driver (customized driver) of the device driver.

More specifically, in the process of creating a customized driver, the customize tool copies the installation set from the customization source to the destination for creating the customized driver and then writes the customization data into a driver information file (this file is also referred to as a UPD file) included in the installation set in the copy destination, thereby creating a customized driver.

Figure 9:
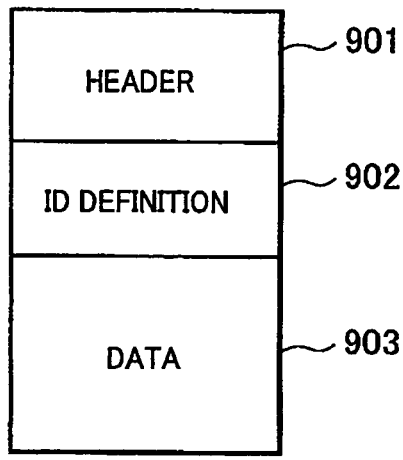
FIG. 9 is a diagram for explaining the data format of a UPD file forming a printer driver.

Here FIG. 9 shows a diagram for explaining a data format of the driver information file (UPD file), which is a file forming a printer driver. As shown in FIG. 9, the UPD file is formed of a header 901, an ID definition 902, and data 903. The ID definition 902 includes a pair of an ID of data stored at 903 and a data location (address). A set of the pairs are stored by the amount equivalent to the number of IDs. The customize tool according to this embodiment modifies the data value corresponding to the ID defined for customization. Unless the ID of the customization data required to be used for the ID definition 902 is defined, a new ID corresponding to the customization data is added to the ID definition 902.

The UPD file exists for each corresponding device driver (printer driver) (for each model). Therefore, customization can vary from one model to another. For example, by using a customized driver set corresponding to one model, a driver of another model can be customized. Moreover, since an ID for customization is used in the ID definition 902, a new version of the printer driver can inherit the settings of the printer driver customized earlier.

The customized printer driver is implemented by using the customize tool so as to read the UPD file containing the customization data when installed or initially started and to read the data 903 stored with being associated with a predetermined ID of the ID definition 902 in the UPD file. For example, it is assumed that the UPD file created by the customize tool contains an ID indicating "CUSTOMIZED" and an address X as its data location in the ID definition 902.

If ID information indicating "CUSTOMIZED" has already been stored in the ID definition 902 at the completion of installation or at initial startup, the printer driver adaptable to customization is previously implemented so as to read out the address corresponding to the ID information. Therefore, if the ID definition 902 of the UPD file includes an ID indicating "CUSTOMIZED," the printer driver reads out the address X of the corresponding data from the ID definition at the completion of installation or at initial startup. Subsequently, the printer driver further reads out a data structure of the device mode, which is actual driver setting data, from the data 903 at the address X. Note here that the address X may be an absolute address or that the first address of the data 903 may be previously stored in the header 901 to set an offset address from the first address of the data 903 at the address X.

In this embodiment, the customize tool writes, as customization data, initial value data (data set with the settings 401 to 404 in FIG. 4) related to the document properties for the document settings, initial value data (data set with the setting 405 in FIG. 4) related to the printer property for the device setting, and data (data set on the UI screen shown in FIG. 5) related to the display methods of the controls on the UI related to the document properties into the UPD file. The customized printer driver reads the UPD file created by the customize tool and operates on the basis of customization information at the completion of installation or at initial startup. Thus, the operating environment of the customized printer driver can be easily constructed.

Returning to description of FIG. 6, the customized driver is created, (S608). Thereafter, in step S609, the customize tool deletes (initializes) data (the model name 360 (See FIG. 3) corresponding to the printer driver that has already been customized) registered in the model name storage area (list section) of the INF file. Then, in step S610, the customize tool writes only the information on the model name corresponding to the printer driver to be customized, which has been stored in step S607, into the model name storage area (list section) of the INF file in order to identify the created customized driver.

More specifically, the customize tool serves as a reading section of the information processing apparatus under the control of the CPU 1. The reading section writes the information for identifying the device driver stored in the storage area into the model name storage area (list section) of the file (INF file) for storing the installation information on the printer driver, in order to identify the customized driver created by the creating section. Moreover, when writing the information for identifying the device driver into the INF file, the reading section deletes the information for identifying the device driver that has already been written.

Regarding the writing into the model name storage area, if a plurality of types of printer drivers are customized (for example, if the printer drivers corresponding to the printer model names 370, 380, and 390 are customized on the UI screen of FIG. 3), a plurality of pieces of information on the corresponding printer model names (370, 380, 390) are written into the model name storage area. Upon completion of writing all data of the printer driver names, the customize tool creates a customized printer driver set in step S611 and then terminates the processing.

While the printer model names are written into the model name storage area of the INF file in this embodiment, the present invention is applicable in the same manner using any file, as long as the customize tool can write and read data to or from the file and can delete data from the file and the installer can reference data in the file.

According to the above processing, only information on the printer model name corresponding to the printer driver customized most recently is written into the model name storage area (list section) of the INF file. The customize tool enables an already customized printer driver to be identified with reference to the INF file when the printer driver is installed.

Moreover, the installer can read information on the model name corresponding to a customized printer driver, which has already written into the model name storage area of the INF file, and can display the information on the model name corresponding to the customized printer driver read out onto the CRT 10 when an end user installs the printer driver.

[Second Embodiment]

Figure 8:
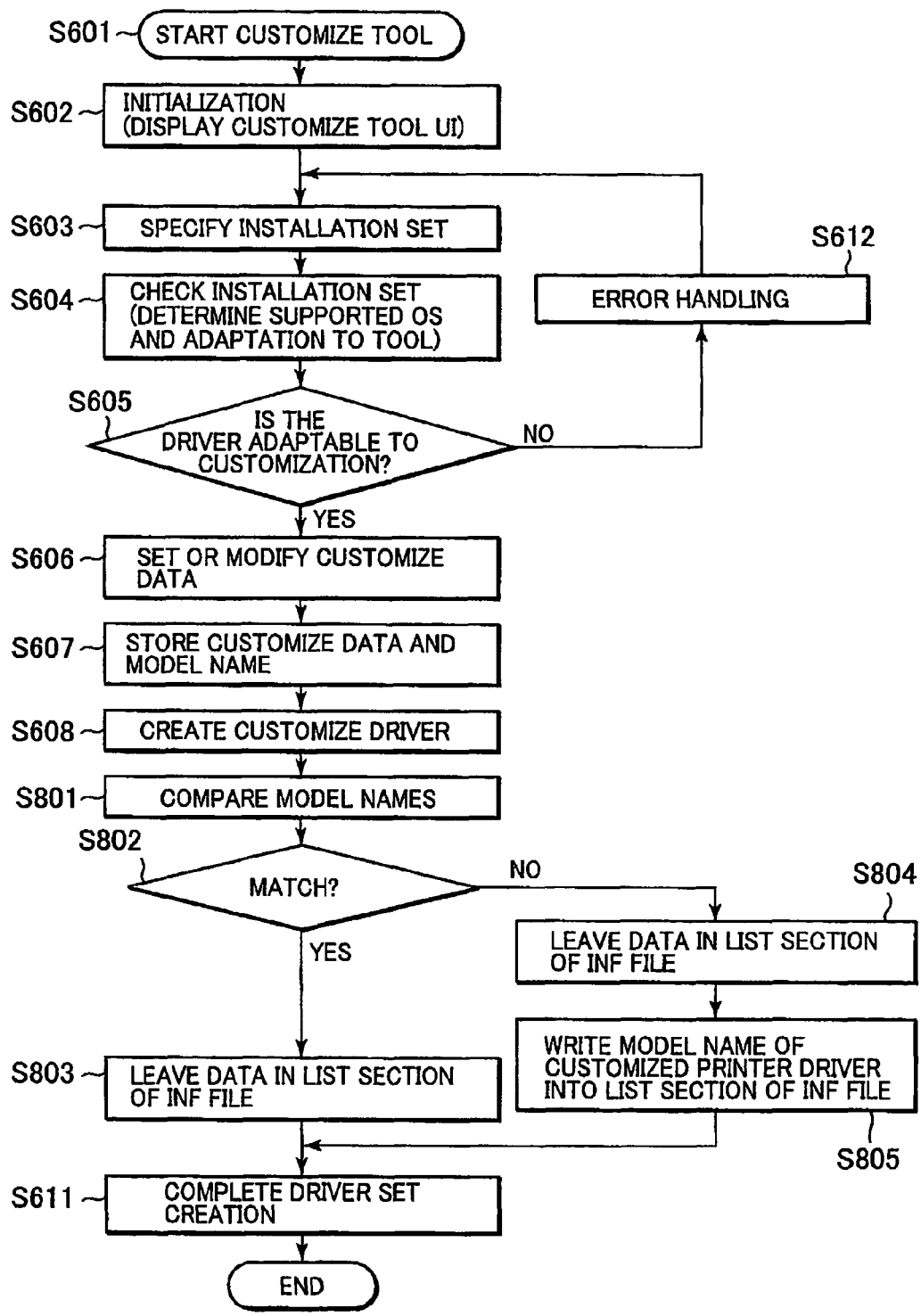
FIG. 8 is a flowchart for explaining a flow of the execution of customization and processing of writing information on a model name corresponding to a customized printer driver into an INF file for describing installation information on the printer driver according to a second embodiment.

The following describes a process of executing customization and a process of writing information on the model name corresponding to a customized printer driver into an INF file containing installation information on the printer driver according to a second embodiment, with reference to FIG. 8. The flowchart of FIG. 8 includes the same processes as those in the flowchart of FIG. 6 in steps S601 to S608 and S611 and S612. In the following description, only processing steps S801 to S805, which are not included in FIG. 6, will be described. A hardware configuration and the like are the same as in the first embodiment, unless otherwise specified, and the processing of the flowchart is assumed to be executed mainly by the customize tool, which is implemented by the CPU 1 in the host computer 3000.

The customize tool serves as a comparing section of the information processing apparatus under the control of the CPU 1. The comparing section compares information for identifying a device driver stored in the storage area with information for identifying a device driver written into the INF file.

If the information for identifying the device driver stored in the storage area matches the information for identifying the device driver written in the INF file as a result of the comparison, the writing section stores the information for identifying the device driver already written in the INF file directly.

On the other hand, unless the information for identifying the above drivers match each other, the writing section deletes the information for identifying the device driver already written in the INF file and writes the information for identifying the device driver stored in the storage area into the model name storage area (list section) of the INF file. Specifically, the processes of steps S801 to S805 are executed as described below. As the information for identifying the device driver, a printer model name is used as an example for the description.

In step S801, the customize tool compares a model name written in the model name storage area (list section) of the INF file with a model name stored in the storage area in the process of step S607 (the printer model name corresponding to the printer driver for which customization data is set on the UI screen (FIG. 3 to FIG. 5)).

If they match each other in Sep S802 (S802: YES), the process progresses to step S803, where the customize tool stores (leaves) the printer model name of the model name storage area (list section) of the INF file directly without writing new information. In step S611, the customize tool then creates a customized printer driver set and terminates the processing.

On the other hand, if the model name written in the model name storage area (list section) of the INF file does not match the model name stored in the storage area in the process of step S607 as a result of the comparison in step S802 (S802: NO), the process progresses to step S804, where the customize tool deletes (initializes) the data registered in the model name storage area (list section) of the INF file. In step S805, the customize tool then writes the information on the model name stored in the step S607 into the model name storage area (list section) of the INF file and advances the process to step S611.

According to the above processing, the information on the name of the printer model corresponding to the customized printer driver is written into the model name storage area (list section) of the INF file. The customize tool enables an already customized printer driver to be identified with reference to the INF file when the printer driver is installed.

Moreover, the installer reads out the information on the model name corresponding to a customized printer driver written in the model name storage area of the INF file, so that the information on the model name corresponding to the customized printer driver, which has been read out, can be displayed on the CRT 10 when an end user installs the printer driver.

Figure 10:
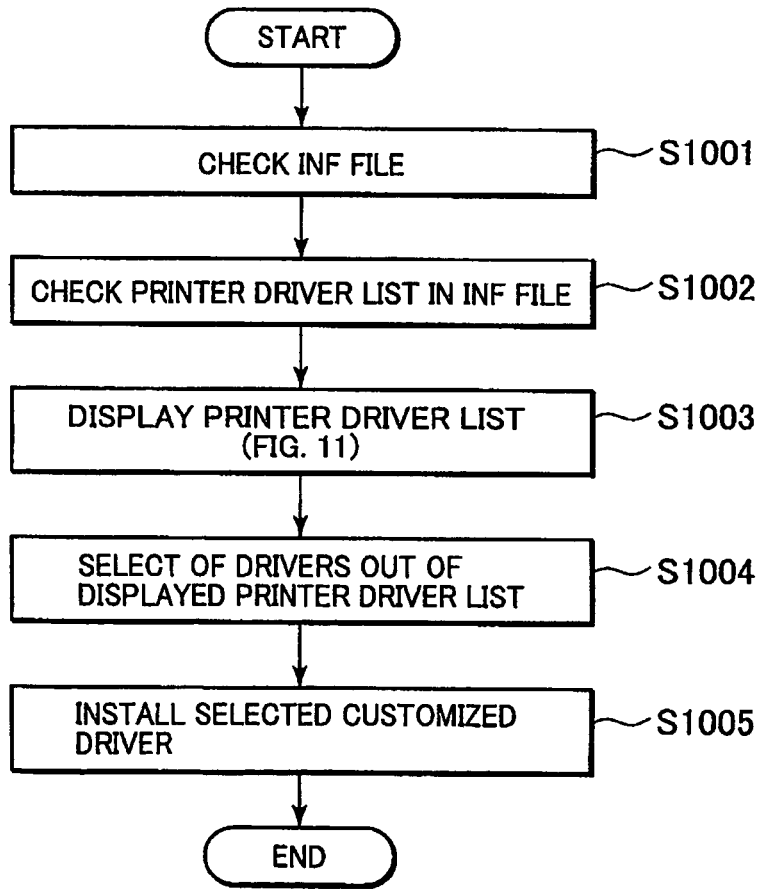
FIG. 10 is a diagram for explaining an installation flow of a customized driver by means of a setup program.
Figure 11:
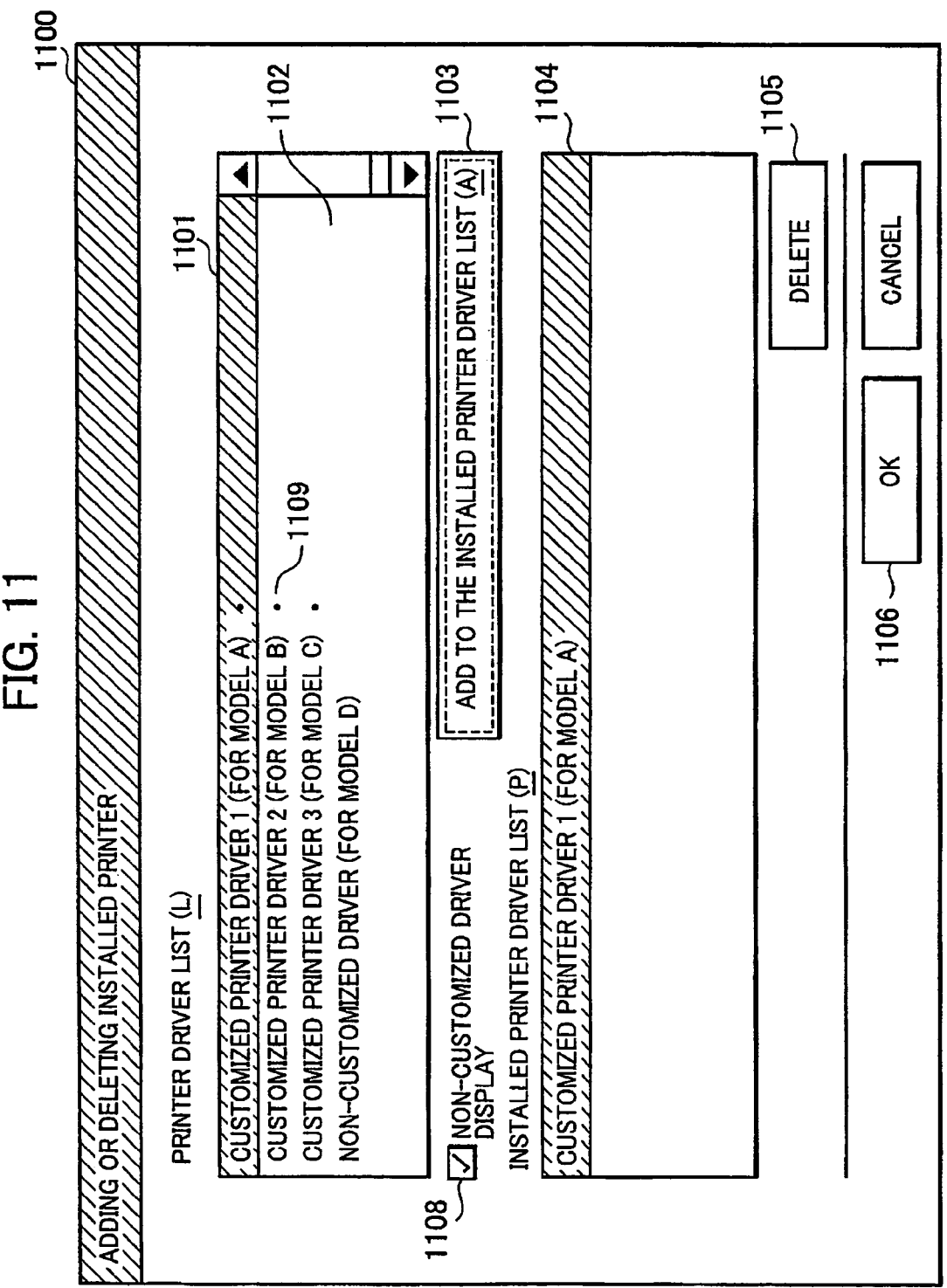
FIG. 11 is a diagram showing an example of a screen displayed on a CRT display by the setup program

FIG. 10 shows an example of installation of a customized driver by means of a setup program. FIG. 11 shows an example of a screen displayed on the CRT by the setup program in step S1003 of FIG. 10. The processing of FIG. 10 starts when an instruction is provided to launch the setup program of the customized installation set. First, in S1001 the setup program checks the INF file processed in step S610 of the above embodiment. Since the INF file has already been processed, the display screen shown in FIG. 11 appears on the display according to the INF file, as long as the INF file is previously created in such a way as to display only customized device drivers if it is required to display the customized device drivers only and to display both customized device drivers and non-customized device drivers if it is required to display the non-customized device drivers together. If there is no error in the INF file in step S1001, the process progresses to step S1002. In step S1002, the setup program reads the INF file to check the list of the printer drivers. In step S1003, the setup program displays the device driver name, model name, driver version, and driver type obtained after the customization, on the basis of the driver list checked in step S1002. In step S1004, the process enters a wait state for a specification with a selection of one or plural drivers out of the displayed printer driver list 1102. In the example user interface 1100 shown in FIG. 11, an option 1101 is selected with a mouse or other input device, by which it is reversed to white on black. A plurality of options can be selected. Upon depression of the "Add to the Installed Printer Driver List" button 1103 with the printer driver in the printer driver list reversed to white on black, the customized printer driver 1104 is added to the installed printer driver list, which has been blank at the initialization.

In FIG. 11, there is shown a condition where the customized printer driver 1 is selected as an installation target. By depressing the button 1105 with the printer driver 1104 reversed to white on black here, the selected state can be reset. Moreover, upon depressing the OK button 1106, the printer drivers on the installed printer list are installed. The printer driver, "Customized printer driver 1 for model A" is selected. In step S1005, the customized device driver selected in step S1004 by using the screen of FIG. 11 is installed.

As another embodiment, both of non-customized and customized device drivers may be previously left in the INF file and flags indicating whether the device drivers are customized may be appended to the device drivers in the INF file separately. The customized device drivers and the non-customized device drivers may be displayed in an identifiable manner such as with a black dot appended to each customized driver in the printer driver list (1109), after a recognition of the device drivers and the non-customized device drivers. Alternatively, a check box 1108 may be provided for switching between display and non-display of the non-customized drivers. Even if non-customized device driver names remain in the INF file, they are not displayed, as long as the check in the check box 1108 is previously removed.

[Other Embodiments]

The present invention can also be achieved by supplying a system or an apparatus with a storage medium (or a recording medium) storing program code (software) for performing the functions of the above embodiments, whereby the computer (or the CPU or MPU) of the system or apparatus reads and executes the program code stored in the storage medium. In this instance, the program code read from the storage medium performs the functions of the above embodiments. Moreover, the present invention includes not only the case where the functions of the above embodiments are performed by executing the program code read by the computer, but also includes the case where the operating system (OS) or the like running on the computer performs a part or all of actual processes on the basis of instructions of the program code, whereby the functions of the above embodiments are performed.

Furthermore, the present invention includes the case where the program code read from the storage medium is written into a function expansion card inserted into the computer or a memory provided in a function expansion unit connected to the computer and then the CPU or the like of the function expansion card or the function expansion unit performs a part or all of the actual processes on the basis of instructions of the program code, whereby the functions of the above embodiments are performed.

If the present invention is applied to the above storage medium, program code supporting the operations of the flowcharts (FIG. 6, FIG. 8, and FIG. 10) described above is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-095693, filed Mar. 29, 2005, which is hereby incorporated by reference herein in its entirety.

What is claimed is:

1. An information processing apparatus having a customizing application for customizing a device driver for controlling a printing device, the information processing apparatus comprising:

a central processing unit (CPU) coupled to a memory, wherein the CPU is programmed to work as:

a displaying unit for displaying names of a plurality of printing devices on a screen provided by the customizing application;

a selecting unit for receiving a name of a printing device to be customized from the names of the plurality of printing devices displayed by the displaying unit before a printer driver is installed;

a receiving unit for receiving a designation of function to be customized;

a customizing unit for customizing a device driver of the name of the printing device received by the selecting unit based on the designation of the function received by the receiving unit; and a generating unit for generating an inf file in which a name of a printing device which is customized by the customizing unit amoung the plurality of printing devices is written, wherein the name of the printing device which is customized by the customizing unit is displayed on a selecting screen to select a device driver to be installed and the name of the printing device which is not customized by the customizing unit is not displayed on the selecting screen, by reading the inf file.

2. A method for an information processing apparatus having a customizing application for customizing a device driver for controlling a printing device, the method comprising:

displaying names of a plurality of printing devices on a screen provided by the customizing application;

receiving a name of a printing device to be customized from the displayed names of the plurality of printing devices before a printer driver is installed;

receiving a designation of function to be customized;

customizing, using a central processing unit (CPU) coupled to a memory, a device driver of the received name of the printing device based on the received designation of the function; and generating an inf file in which a name of a printing device which is customized among the plurality of printing devices is written, wherein the name of the printing device which is customized is displayed on a selecting screen to select a device driver to be installed and the name of the printing device which is not customized is not displayed on the selecting screen, by reading the inf file.

3. A non-transitory computer-readable storage medium storing a control program that causes a computer to perform the method according to claim 2.

4. The information processing apparatus according to claim 1,
wherein the screen provided by the customizing application accepts a designation of a driver set to be customized.

5. The information processing apparatus according to claim 1,
wherein the screen provided by the customizing application accepts an instruction to invoke a screen of a printer driver.

6. The information processing apparatus according to claim 1, further comprising:
a determination unit configured to determine whether the device driver of the name of the printing device received by the selecting unit is customizable.

7. The method according to claim 2,
wherein the screen provided by the customizing application accepts a designation of a driver set to be customized.

8. The method according to claim 2,
wherein the screen provided by the customizing application accepts an instruction to invoke a screen of a printer driver.

9. The method according to claim 2, further comprising:
determining whether the device driver of the received name of the printing device received is customizable.

10. The non-transitory computer-readable storage medium according to claim 3,
wherein the screen provided by the customizing application accepts a designation of a driver set to be customized.

11. The non-transitory computer-readable storage medium according to claim 3,
wherein the screen provided by the customizing application accepts an instruction to invoke a screen of a printer driver.

12. The non-transitory computer-readable storage medium according to claim 3,
wherein the screen provided by the customizing application accepts a designation of a driver set to be customized.

* * * * *